US010795146B2

(12) United States Patent
Garrison et al.

(10) Patent No.: US 10,795,146 B2
(45) Date of Patent: Oct. 6, 2020

(54) SMARTPHONE ADAPTER FOR IMAGING THROUGH OPTICAL DEVICES

(71) Applicant: Celestron Acquisition, LLC, Torrance, CA (US)

(72) Inventors: Joseph Garrison, Orange, CA (US); Ron Peters, Long Beach, CA (US)

(73) Assignee: Celestron Acquisition, LLC, Torrance, CA (US)

( * ) Notice: Subject to any disclaimer, the term of this patent is extended or adjusted under 35 U.S.C. 154(b) by 0 days.

(21) Appl. No.: 16/296,061

(22) Filed: Mar. 7, 2019

(65) Prior Publication Data
US 2019/0302443 A1   Oct. 3, 2019

Related U.S. Application Data

(60) Provisional application No. 62/650,693, filed on Mar. 30, 2018.

(51) Int. Cl.
*G02B 23/24* (2006.01)
*G02B 23/16* (2006.01)
(Continued)

(52) U.S. Cl.
CPC ......... *G02B 23/2484* (2013.01); *G02B 7/004* (2013.01); *G02B 23/16* (2013.01);
(Continued)

(58) Field of Classification Search
CPC .... G02B 23/2484; G02B 7/004; G02B 23/16; G02B 21/362; G02B 23/12; H04M 1/21; H04M 1/04; G03B 17/566
See application file for complete search history.

(56) References Cited

U.S. PATENT DOCUMENTS

| 2,967,456 A | 1/1961 | Maier |
| 3,690,007 A * | 9/1972 | Curtis ...................... A61C 3/16 433/158 |

(Continued)

FOREIGN PATENT DOCUMENTS

CN   206541063   10/2017

OTHER PUBLICATIONS

Carson HookUpz 2.0 Universal Adapter, retrieved from https://www.carson.com/products/hookupz2-is-200/ on Apr. 16, 2019, pp. 1-3.

*Primary Examiner* — Timothy J Henn
(74) *Attorney, Agent, or Firm* — Raubvogel Law Office

(57) ABSTRACT

An adapter may be used to couple an imaging device, such as a smartphone, to an optical device such as a telescope. The adapter may have an optical device mounting feature that mounts the adapter to the optical device, an imaging device mounting feature that mounts the imaging device to the adapter, and a positioning mechanism that adjustably positions the imaging device mounting feature relative to the optical device mounting feature. The optical device mounting feature may have a first arm, a second arm that is movable relative to the first arm to clamp a portion of the optical device between the first arm and the second arm, and a lock that can be actuated to restrict motion of the second arm away from the first arm. The positioning mechanism may be actuatable to move the imaging device, relative to the optical device, along three orthogonal axes.

15 Claims, 14 Drawing Sheets

(51) Int. Cl.
  *H04M 1/04* (2006.01)
  *G02B 7/00* (2006.01)
  *G03B 17/56* (2006.01)
  *H04M 1/21* (2006.01)
  *G02B 21/36* (2006.01)

(52) U.S. Cl.
  CPC ............ *G03B 17/566* (2013.01); *H04M 1/04* (2013.01); *H04M 1/21* (2013.01); *G02B 21/362* (2013.01)

(56) References Cited

U.S. PATENT DOCUMENTS

| | | | | |
|---|---|---|---|---|
| 4,810,019 | A * | 3/1989 | Brucher | B23Q 1/76 294/106 |
| 5,168,168 | A * | 12/1992 | Luecke | B25J 15/103 269/237 |
| 5,836,205 | A * | 11/1998 | Meyer | F16H 19/04 74/89.17 |
| 6,717,727 | B2 * | 4/2004 | Barziza | G02B 23/16 359/363 |
| 7,246,956 | B2 * | 7/2007 | Pernstich | F41G 3/165 396/428 |
| 7,661,221 | B2 * | 2/2010 | Holmberg | F41G 11/003 396/419 |
| 7,883,121 | B2 * | 2/2011 | Henry | F16L 23/10 285/367 |
| 8,210,757 | B2 * | 7/2012 | Sterns | G02B 23/16 396/419 |
| D708,653 | S | 7/2014 | Hyers | |
| 9,191,562 | B1 * | 11/2015 | Schorr, II | H04N 1/00246 |
| 9,442,349 | B2 | 9/2016 | Hyers | |
| 9,451,874 | B2 * | 9/2016 | Bromwich | A61B 1/00126 |
| 9,624,958 | B2 | 4/2017 | Hyers | |
| 9,632,305 | B2 | 4/2017 | Peters et al. | |
| 9,737,976 | B2 * | 8/2017 | Christensen | B25B 5/04 |
| 9,754,563 | B1 * | 9/2017 | Chen | G10D 3/053 |
| 9,795,293 | B2 | 10/2017 | Howes | |
| D807,950 | S * | 1/2018 | Steinberger | D17/20 |
| 10,234,749 | B2 | 3/2019 | Hyers | |
| 10,458,579 | B2 * | 10/2019 | Bowman | F16L 37/091 |
| 2002/0197075 | A1 * | 12/2002 | Crockett | G03B 17/48 396/429 |
| 2004/0049892 | A1 * | 3/2004 | Messina | F16L 3/12 24/279 |
| 2010/0207385 | A1 * | 8/2010 | Nishimura | F16B 2/10 285/364 |
| 2012/0106946 | A1 * | 5/2012 | Johnson | G03B 17/566 396/544 |
| 2012/0240444 | A1 * | 9/2012 | Russell | F41C 27/00 42/90 |
| 2012/0320340 | A1 | 12/2012 | Coleman, III | |
| 2013/0016963 | A1 | 1/2013 | Miller | |
| 2013/0331148 | A1 | 12/2013 | Brough | |
| 2014/0142390 | A1 | 5/2014 | Bromwich | |
| 2014/0226965 | A1 * | 8/2014 | Fujikake | G03B 17/566 396/544 |
| 2014/0253800 | A1 * | 9/2014 | Mcleod | F16M 11/041 348/376 |
| 2014/0317987 | A1 * | 10/2014 | Kuehl | G03B 29/00 42/90 |
| 2014/0362283 | A1 * | 12/2014 | Coppage | G03B 17/561 348/373 |
| 2015/0042873 | A1 * | 2/2015 | Hunt | H04N 5/2254 348/373 |
| 2015/0054935 | A1 | 2/2015 | Muramatsu | |
| 2015/0167707 | A1 * | 6/2015 | Hyers | G02B 7/003 24/488 |
| 2015/0192242 | A1 * | 7/2015 | Zhang | F16M 13/02 248/176.3 |
| 2015/0362828 | A1 * | 12/2015 | Patel | G03B 17/48 348/75 |
| 2016/0051142 | A1 * | 2/2016 | Howes | A61B 3/14 351/245 |
| 2017/0175949 | A1 * | 6/2017 | Cardozo | F16H 25/2015 |
| 2017/0190010 | A1 | 7/2017 | Hyers | |
| 2018/0059355 | A1 * | 3/2018 | Schorman | G03B 11/00 |
| 2018/0259118 | A1 * | 9/2018 | Shen | F16M 13/02 |

* cited by examiner

SMARTPHONE ADAPTER FOR IMAGING THROUGH OPTICAL DEVICES

CROSS-REFERENCE TO RELATED APPLICATIONS

The present application claims the benefit of U.S. Provisional Application Ser. No. 62/650,693 for "SMARTPHONE ADAPTER FOR IMAGING THROUGH OPTICAL DEVICES", filed on Mar. 30, 2018, the disclosure of which is incorporated herein by reference in its entirety.

TECHNICAL FIELD

The present document relates to systems and methods for coupling an imaging system, such as a smartphone, to an optical device so as to allow image capture through the optical device.

BACKGROUND

Many people enjoy viewing objects through optical devices made for distant viewing, such as telescopes, binoculars, and the like. Such optical devices can make it possible to view distant objects as though they were much closer to the user's position. Other optical devices, such as microscopes, are made for magnifying closer objects, and may be used for recreational, scientific, or commercial purposes. In many instances, a user may want to capture the image viewed through the optical device.

Some devices exist to help couple smartphones to optical devices. Many of these provide no mechanism for adjusting the distance between the smartphone and the optical device. Accordingly, the view of the subject matter captured by the smartphone may be too small, too large (i.e., cropped), and/or of poor quality due to vignetting and/or other artifacts. Further, many such devices do not attach sufficiently securely to the optical device. As a result, the position of the smartphone relative to the imaging device may shift over time, resulting in misalignment of the imaging device. This can cause poor image quality.

SUMMARY

The present disclosure describes an adapter for connecting an imaging device, such as a smartphone, to an optical device, such as a telescope. Although this description is focused on attachment of a smartphone to a telescope, those of skill in the art will readily recognize that the features and steps described herein can be readily applied to different optical devices and/or imaging devices.

In some embodiments, the adapter firmly connects the smartphone to the telescope with an optical device mounting feature including a first arm and a second arm that pivots relative to the first arm to clamp a portion of the telescope therebetween. The optical device mounting feature may allow fine adjustment of the positioning of the smartphone in three axes relative to the telescope. This adjustability may make it easy to capture the best possible image through the telescope with the smartphone's camera.

The arms may be spring-loaded, and may define a clamp that connects the adapter to the eyepiece of the telescope. Such a clamp may enable quick and convenient connection of the adapter to the telescope. It may be desirable to provide a tighter connection to prevent movement of the smartphone relative to the telescope, which may otherwise occur as a result of sagging due to gravity, or from shifting under user pressure on the smartphone's touchscreen. Such motion can cause the smartphone's camera to become misaligned with the telescope, which may significantly degrade the quality of images taken with the smartphone's camera. Using a very tight spring may be undesirable because the clamp may become very difficult to open by hand.

In at least one embodiment, the described adapter addresses this issue by including a lock for the clamp that connects the adapter to the telescope. The optical device mounting feature may have a threaded rod that slides relative to the first arm when the second arm moves. A threaded collar may be movable along the threaded rod to prohibit such sliding motion, and optionally, upon further advancement along the threaded rod, urge the second arm to move further toward the first arm. Thus, the optical device mounting feature may firmly and conveniently secure the spring-loaded clamp connection to the optical device. This may prevent sagging or shifting of the smartphone relative to the optical device. In this manner, the mechanism tightly secures the spring-loaded clamp onto the optical device, so as to ensure that there is no movement of the smartphone relative to the optical device.

In addition to more secure mounting to the telescope, the adapter may provide unique features for improving imaging through the telescope.

When a smartphone camera lens is positioned too close to or too far away from the exit lens of an optical device's eyepiece, unwanted vignetting or cropping of the resultant captured image can occur. In at least one embodiment, the described adapter addresses this issue by including a Z-axis fine adjustment that allows the distance between the smartphone's camera lens and the exit lens of the optical device's eyepiece to be easily and precisely adjusted.

Such Z-axis fine adjustment may allow precise placement of the smartphone's camera lens at the proper distance from the exit lens of the telescope's eyepiece (i.e., at the eyepiece's "eye relief" distance). This may allow the focused light from the optical device to best fill the camera lens, providing an image with minimized vignetting or cropping. In at least one embodiment, the Z-axis fine adjustment is achieved with a rack-and-pinion gear. Further, in at least one embodiment, fine adjustment along the X- and Y-axes is also implemented using rack-and-pinion gears, enabling fine-tuning of the three-dimensional position of the smartphone, relative to the telescope.

In some embodiments, an adapter for coupling an imaging device to an optical device may include an optical device mounting feature configured to mount the adapter to the optical device, an imaging device mounting feature configured to mount an imaging device to the adapter, and a positioning mechanism that adjustably positions the imaging device mounting feature relative to the optical device mounting feature. The positioning mechanism may be actuated to move the imaging device along a Z-axis toward or away from the optical device.

In some embodiments, an adapter for coupling an imaging device to an optical device may include an optical device mounting feature configured to mount the adapter to the optical device. The optical device mounting feature may include a first arm, a second arm that is movable relative to the first arm to clamp a portion of the optical device between the first arm and the second arm, and a lock that can be actuated to restrict motion of the second arm away from the first arm. The adapter may further include an imaging device mounting feature configured to mount an imaging device to the adapter.

In some embodiments, an adapter for coupling an imaging device to an optical device may include an optical device mounting feature configured to mount the adapter to the optical device. The optical device mounting feature may include a first arm, a second arm that is movable relative to the first arm to clamp a portion of the optical device between the first arm and the second arm, and a lock with a threaded knob that is rotatable to advance the knob toward and into contact with the second arm to restrict motion of the second arm away from the first arm. The adapter may further include an imaging device mounting feature configured to mount an imaging device to the adapter, and a positioning mechanism that adjustably positions the imaging device mounting feature relative to the optical device mounting feature. The positioning mechanism may be actuated to move the imaging device along a Z-axis toward or away from the optical device, along an X-axis perpendicular to the Z-axis, and along a Y-axis perpendicular to the X-axis and the Z-axis.

In some embodiments, a method for coupling an imaging device to an optical device may utilize an adapter with an optical device mounting feature, an imaging device mounting feature, and a positioning mechanism. The optical device mounting feature may be used to mount the adapter to the optical device. The imaging device mounting feature may be used to mount an imaging device to the adapter. The positioning mechanism may be used to adjustably position the imaging device mounting feature relative to the optical device mounting feature by actuating the positioning mechanism to move the imaging device along a Z-axis toward or away from the optical device.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

The techniques described herein can be used in connection with any type of optical device, including for example telescopes, spotting scopes, rifle scopes, monoculars, binoculars, and microscopes.

In at least one embodiment, the described adapter includes an imaging device mounting feature in the form of a holder that holds the smartphone, and an optical device mounting feature in the form of a spring-loaded clamp that attaches to the eyepiece section of the optical device, which may be a telescope. The spring-loaded clamp may have a tensioning/locking mechanism that rigidly tensions and locks the clamp onto the telescope.

The spring-loaded clamp's unique tensioning/locking rod mechanism as described herein is convenient and easy to use, and ensures a firm connection of the adapter onto the optical device. This firm connection prevents any movement of the smartphone relative to the optical device.

The adapter may have three fine adjustment knobs that connect to rack-and-pinion gears for precise X-, Y-, and Z-axis positioning of the smartphone's camera relative to the telescope's eyepiece. The Z-axis fine adjustment knob may allow fine adjustment of the smartphone camera's position in the direction parallel to the telescope's exiting optical axis, or the axis along which the viewer views the subject through the telescope. This may allow easy and precise adjustment of the smartphone camera's distance from the telescope's eyepiece, so that the image captured by the smartphone will have minimal vignetting or cropping. In at least one embodiment, the Z-axis fine adjustment is implemented using a rack-and-pinion gear.

Other adapters with no Z-axis adjustment have significant vignetting or cropping of the images captured by the smartphone's camera. This is because the distance of the camera from the exit lens of the eyepiece cannot be adjusted. Advantageously, the present disclosure may provide for fine control over the Z-axis position of the smartphone relative to the telescope, providing for a broad range of precisely-adjustable positioning.

Exemplary System Including Optical and Imaging Devices

Figure 1:
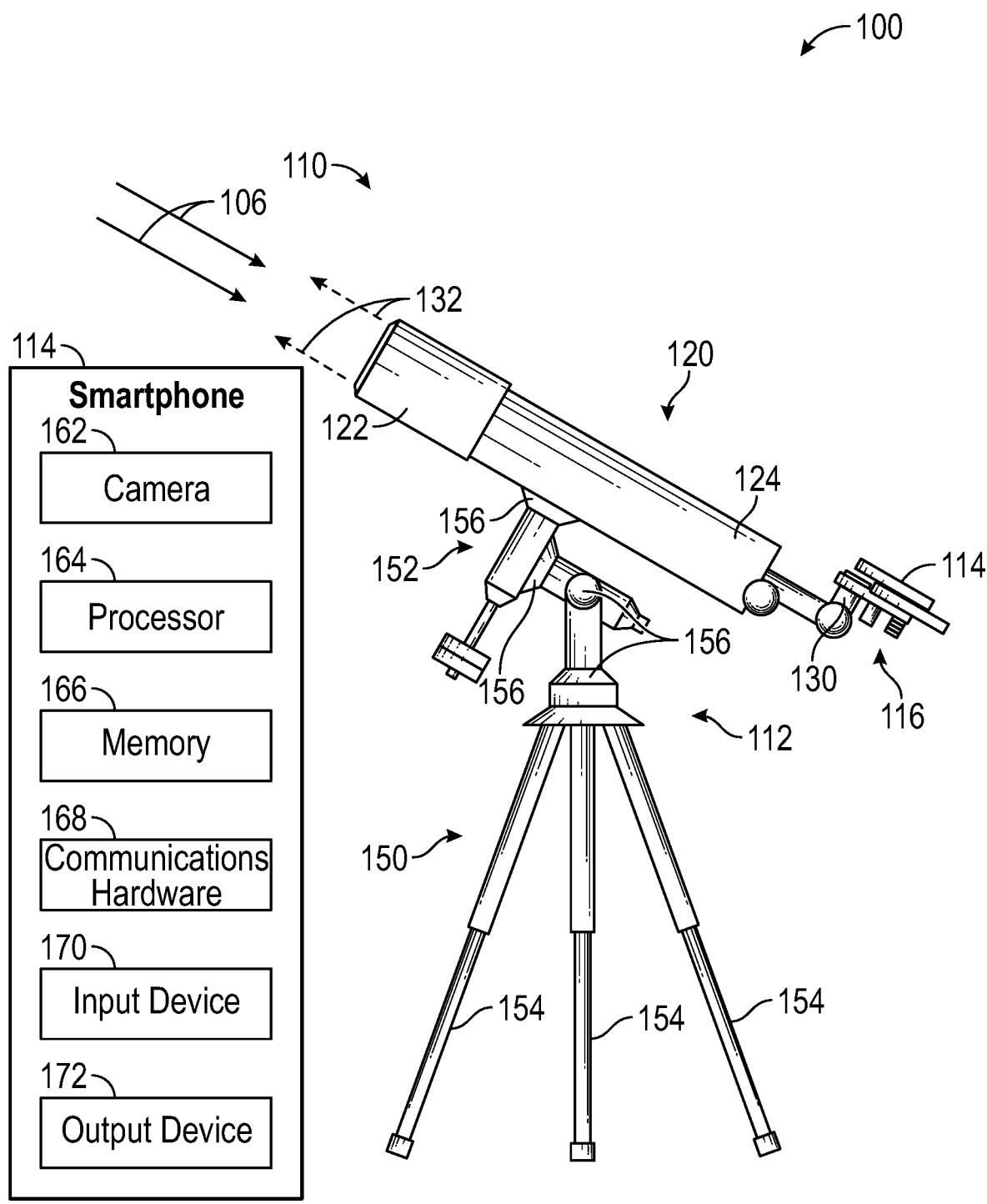
FIG. 1 is a side elevation view of system including an optical device in the form of a telescope, according to one embodiment.

Referring to FIG. 1, a side elevation view depicts a system 100 including an optical device in the form of a telescope 110, according to one embodiment. In this application, an "optical device" may be any device that is designed to direct, capture, or otherwise manipulate light for viewing by a user. For example, the optical device may include a telescope, binoculars, periscope, camera, lens attachment, microscope, and/or any other device that utilizes lenses, mirrors, and/or prisms to manipulate light.

In the system 100 of FIG. 1, the optical device is a telescope 110, as shown. The telescope 110 may receive light 106, which may be extra-terrestrial light, and/or light from any other source, and may be used to provide the user with a view of the subject.

As shown, the system 100 may include multiple exemplary components. Such components may include, but need not be limited to, the telescope 110, a support 112, and an imaging device, which may take the form of a smartphone 114. In alternative embodiments, an imaging device need not be a smartphone, but may instead be any other device for capturing still and/or video imagery, such as a tablet, phablet, digital camera, film-based camera, video camera, and/or the like.

The telescope 110 may, in certain embodiments, be used to view far-away objects, such as extra-terrestrial objects. In other embodiments, the telescope 110 may be used to view nearer, terrestrial objects. The telescope 110 may be supported by the support 112 at an orientation suitable for viewing and/or photographing the subject. The support 112 may facilitate orientation of the telescope 110 at the subject. In some embodiments, the support 112 may provide two-axis adjustment (for example, azimuth and elevation) of the orientation of the telescope 110.

The smartphone 114 may optionally be coupled to the telescope 110 with an adapter 116 to capture a view of the subject, as provided by the telescope 110. Optionally, the smartphone 114 may be used to capture images of such extra-terrestrial or terrestrial subject matter, through the capture of light received by the telescope 110. In effect, the telescope 110 may act as a lens system for the smartphone 114.

As shown, the telescope 110 may have a housing 120, which may have a generally tubular shape as shown, or in alternative embodiments, another suitable shape such as a square or rectangular cross-sectional shape. The housing 120 may be sized to provide the desired aperture size so that the telescope 110 can capture sufficient light to generate bright, clear images with little vignetting, within a relatively short exposure period.

The housing 120 may have an aperture end 122 and a viewing end 124. The aperture end 122 may be oriented toward the subject matter to be viewed and/or imaged. Proximate the viewing end 124, the telescope 110 may have an eyepiece 130 coupled to the viewing end 124 of the housing 120. The eyepiece 130 may be designed such that an image of the light 106 captured by the telescope 110 is focused at the eyepiece 130. Thus, the user may view and/or capture the image through the eyepiece 130. The telescope 110 may have a field-of-view 132.

The support 112 may have a base portion 150 and a telescope mounting portion 152. The base portion 150 may provide stable support for the telescope mounting portion 152, and thence, for the telescope 110. Thus, the base portion 150 may have multiple legs 154 that provide such stability. If desired, the legs 154 may be arranged to define a tripod or other known support structure. The telescope mounting portion 152 may have one or more joints 156 that can be adjusted to change the position and/or orientation of the telescope 110 relative to the support 112. The telescope mounting portion 152 may have one or more mounting features that mate with and/or are otherwise secured to the telescope 110, for example, via attachment to an accessory mount (not shown) or other support attachment feature of the telescope 110.

The joints 156 may be user-adjustable in a variety of ways. According to some embodiments, the joints 156 may be manually adjusted and fixed in their respective desired orientations with set screws or other fixation devices. In other embodiments, the joints 156 may be motor-driven. Stepper motors or other motors that provide fine control and locking capability may be used. Such motors may, if desired, be electronically controlled.

The smartphone 114 may have a camera 162, a processor 164, memory 166, communications hardware 168, and/or other electronics that enable the smartphone 114 to run apps that facilitate image capture and/or other functions. The smartphone 114 may also have an input device 170 and an output device 172 designed to receive input from and provide output, respectively, to a user. In some embodiments, the input device 170 and the output device 172 may be integrated, for example, in the form of a touch screen.

The smartphone 114 may advantageously be coupled to the telescope 110 in a secure, yet adjustable manner. The adapter 116 may be made to accomplish this, as will be shown and described in greater detail below.

Exemplary Adapter

Figure 2A:
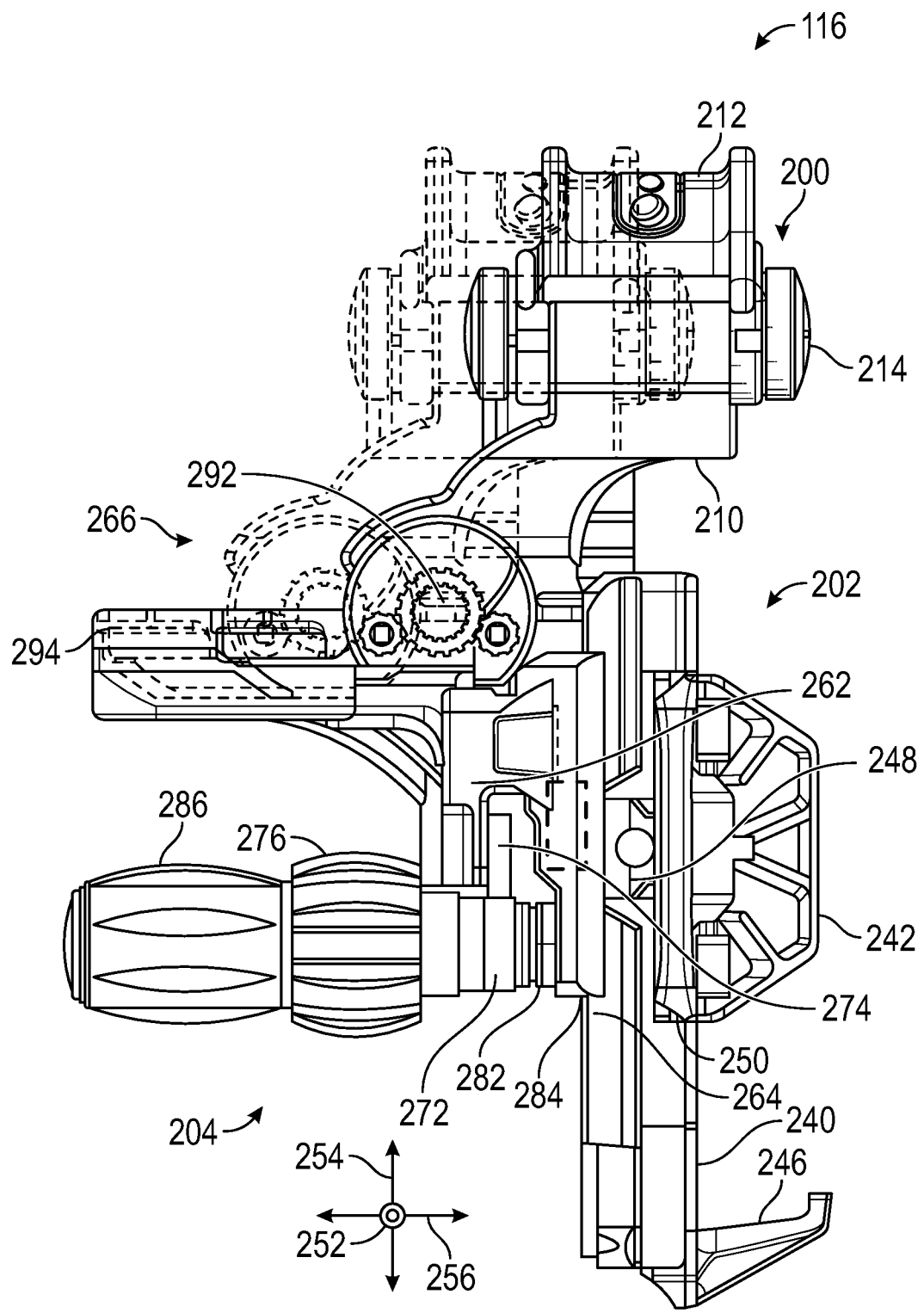
FIGS. 2A and 2B are side elevation and perspective views, respectively, of the adapter of FIG. 1, according to one embodiment, illustrating one way in which Z-axis adjustability may be provided.
Figure 2B:
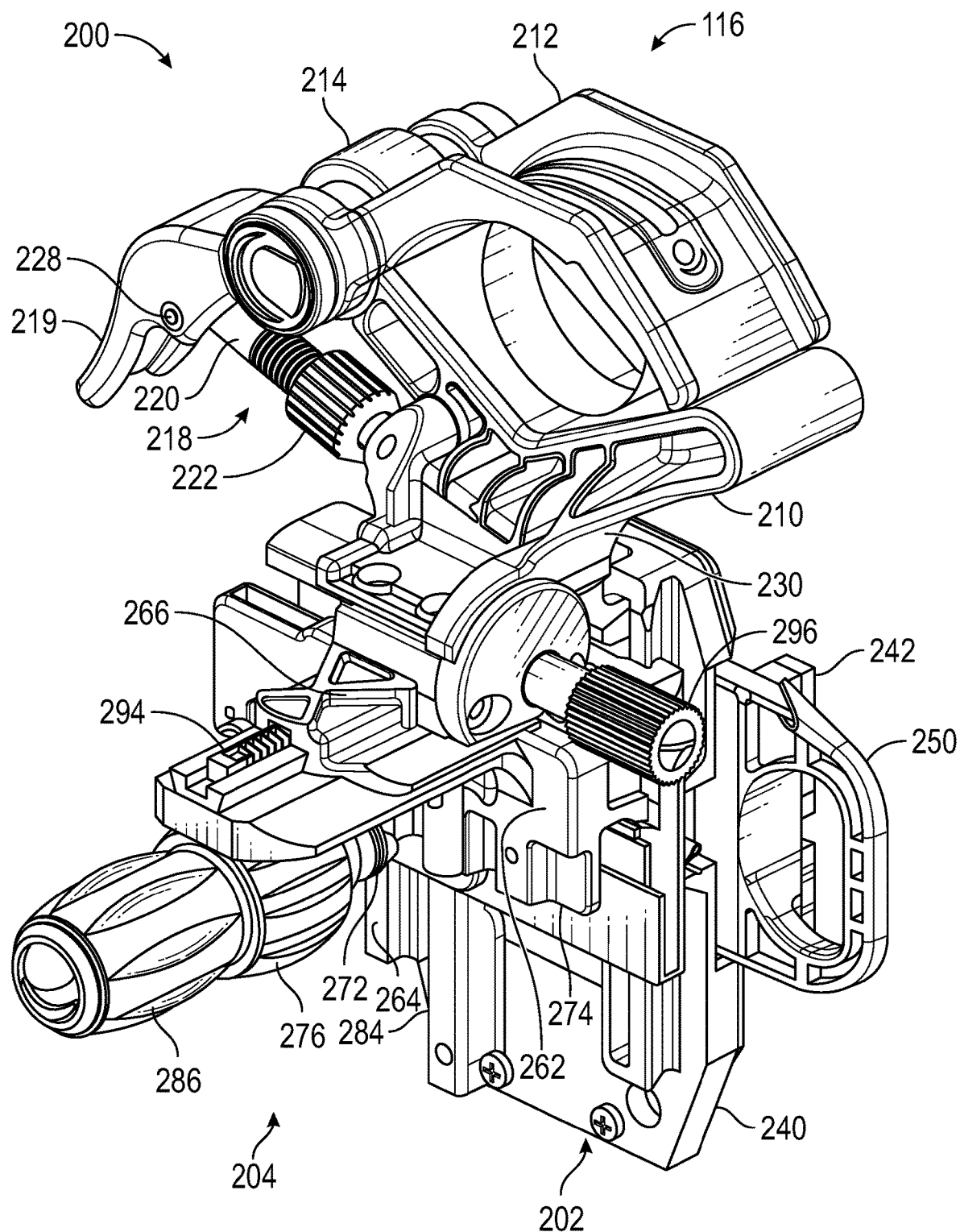

FIGS. 2A and 2B are side elevation and perspective views, respectively, of the adapter 116 of FIG. 1, according to one embodiment, illustrating one way in which Z-axis adjustability may be provided.

Figure 3A:
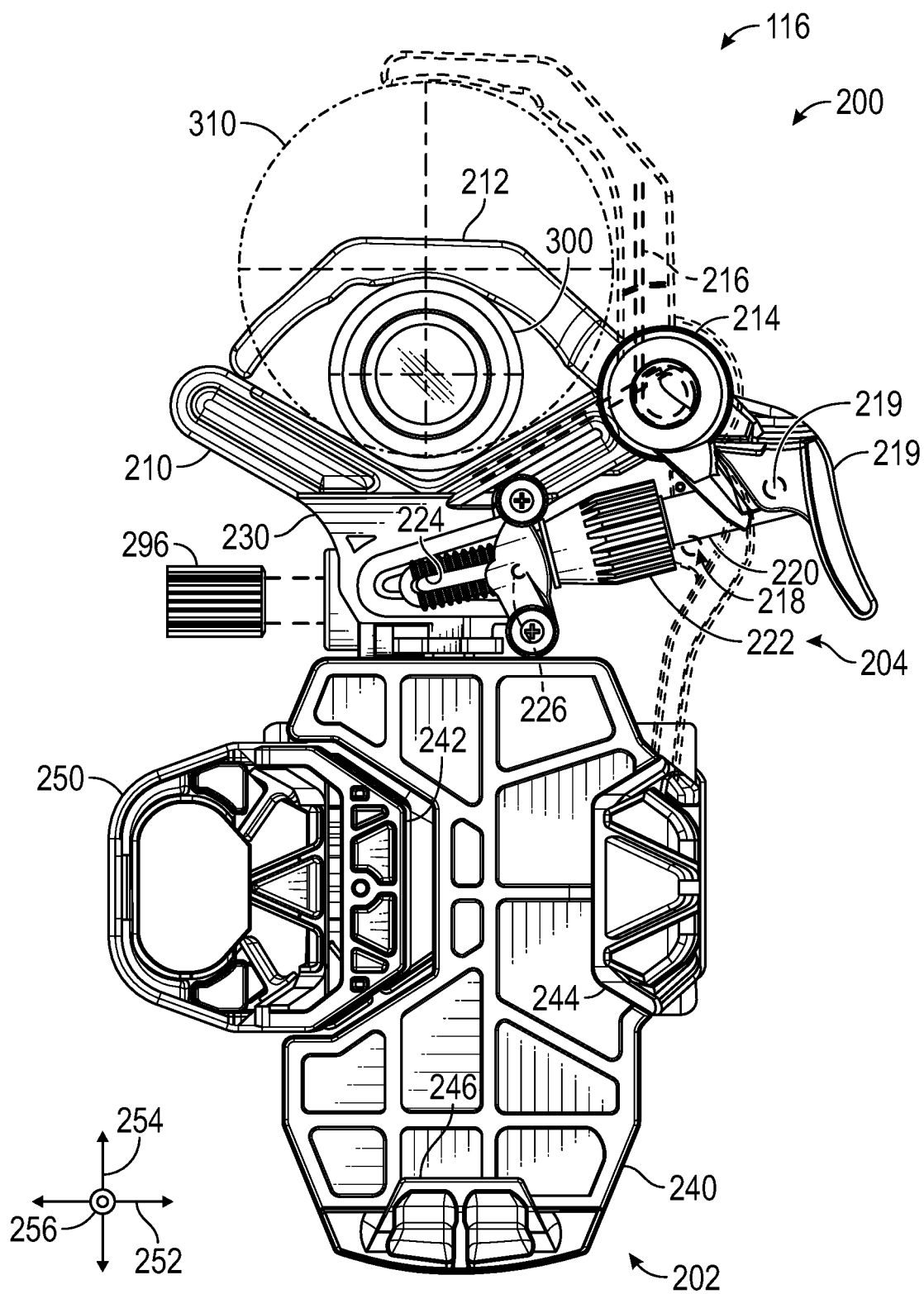
FIGS. 3A and 3B are front elevation and perspective views, respectively, of the adapter of FIG. 1, according to one embodiment, illustrating one way in which secure attachment to the telescope may be carried out.
Figure 3B:
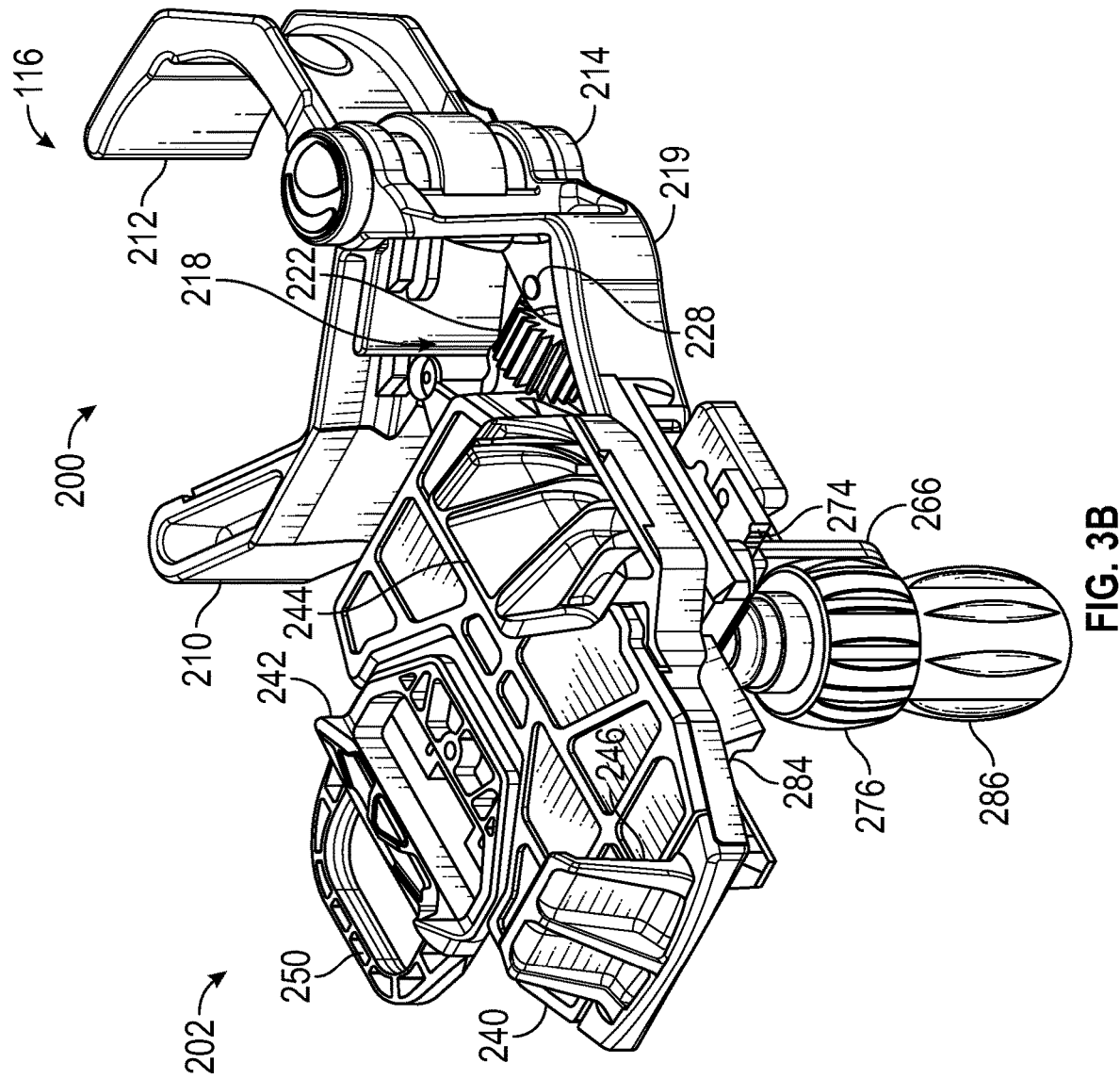

FIGS. 3A and 3B are front elevation and perspective views, respectively, of the adapter 116 of FIG. 1, according to one embodiment, illustrating one way in which secure attachment to the telescope 110 may be carried out.

Referring to FIGS. 2A, 2B, 3A, and 3B, the adapter 116 may have an optical device mounting feature 200 that secures the adapter 116 to the telescope 110, an imaging device mounting feature 202 that secures the smartphone 114 to the adapter 116, and a positioning mechanism 204 that controls the relative position of the imaging device mounting feature 202 relative to the optical device mounting feature 200.

As mentioned previously, the optical device mounting feature 200 may securely attach the smartphone 114 to the telescope 110 in a manner that significantly restricts undesired relative motion between the telescope 110 and the smartphone 114. Thus, the optical device mounting feature 200 may maintain the smartphone 114 at the optical imaging position set by the user with the positioning mechanism 204.

The optical device mounting feature 200 may have a first arm 210 and a second arm 212 connected to the first arm 210 via a pivot joint 214. The first arm 210 may be stationary, relative to the positioning mechanism 204, and the second arm 212 may be pivotable, relative to the first arm 210, about the axis of rotation of the pivot joint 214. The optical device mounting feature 200 may further have a resilient mechanism that urges the second arm 212 to pivot toward the first arm 210 to facilitate attachment of the optical device mounting feature 200 to the telescope 110, or more specifically, to the eyepiece 130.

The resilient mechanism can include any device that can store potential energy and exert force on another component. Examples include linear springs, torsional springs, gas springs, and the like. In the adapter 116 of FIGS. 2A through 3B, the resilient mechanism may optionally take the form of a torsional spring 216 residing generally in the pivot joint 214, with arms that are urged to pivot closer together by a central helical portion. The arms of the torsional spring 216 may urge the second arm 212 to rotate toward the first arm 210, thereby enabling the optical device mounting feature 200 to exert gripping force on the eyepiece 130 in an unlocked position.

Due to the force exerted by the torsional spring 216, the rest position of the second arm 212 may be such that the second arm 212 is in contact with the first arm 210. The second arm 212 may have a handle 219 that can easily be grasped by a user and urged toward the remainder of the adapter 116 to overcome the force exerted by the torsional spring 216 and urge the second arm 212 to rotate away from the first arm 210. Thus, the user can grip and actuate the handle 219 to open the clamp defined by the first arm 210 and the second arm 212, and then once the eyepiece 130 is between the first arm 210 and the second arm 212, release the handle 219 to allow the torsional spring 216 to move the second arm 212 back toward the first arm 210, clamping the eyepiece 130 between the first arm 210 and the second arm 212 as shown in FIG. 3A. As also shown in FIG. 3A, the first arm 210 and the second arm 212 may be sized and shaped to receive components ranging from a small diameter 300 to a large diameter 310.

The optical device mounting feature 200 may further include a lock 218 that can be actuated to lock the second arm 212 in place relative to the first arm 210. The lock 218 may be any device that can be actuated to restrict motion of one or more other members. In the adapter 116, the lock 218 may include a threaded rod 220 and a threaded collar 222. The threaded rod 220 may have exterior threads that mate with interior threads within a bore of the threaded collar 222. The threaded collar 222 may be knurled or otherwise shaped and/or textured so that a user can easily grasp and rotate the threaded collar 222 about the axis of the threaded rod 220 to urge the threaded collar 222 to move in either direction along the threaded rod 220.

The threaded rod 220 may have a slot 224 extending along its length. A first pin 226 may extend through the slot 224, transverse to the axis of the threaded rod 220. One end of the threaded rod 220 may be pivotably coupled to a second pin 228 secured to the handle 219 of the second arm 212. The first pin 226 may be secured to a base 230 of the first arm 210, and as it resides in the slot 224, may guide motion of the threaded rod 220 relative to the base 230. The first pin 226 may be able to translate along the slot 224, along the length of the threaded rod 220. Thus, one end of the threaded rod 220 may be fixed relative to the handle 219, and when the threaded collar 222 is positioned away from the base 230, the other end of the threaded rod 220 may be translatable along a continuously variable displacement from the base 230.

In order to lock the second arm 212 in position relative to the first arm 210, the threaded collar 222 may be advanced toward the first pin 226, and hence toward the base 230 of the first arm 210. Once the threaded collar 222 is in contact with the base 230, a minimum distance between the first pin 226 and the second pin 228 may be established so that the handle 219 is unable to be moved toward the base 230. Thus, the second arm 212 may be locked in position and unable to move away from the first arm 210.

Furthermore, the threaded collar 222 may be further actuated, while in contact with the base 230, to urge the handle 219 to move away from the base 230, thereby urging the second arm 212 to move toward the first arm 210. With the eyepiece 130 between the first arm 210 and the second arm 212, this may cause the eyepiece 130 to be gripped more tightly between the first arm 210 and the second arm 212. The mechanical advantage provided by the motion of the threaded collar 222 may enable the user to exert greater gripping force on the eyepiece 130 than would otherwise be achievable. Actuation of the threaded collar 222 may continue until the user deems the optical device mounting feature 200 is sufficiently tightly secured to the eyepiece 130. Thus, the lock 218 may provide user-adjustable clamping force. In some embodiments, the user may continue advancing the threaded collar 222 until it becomes too difficult to rotate the threaded collar 222 further by hand. The result may be a very secure fixation of the optical device mounting feature 200 to the eyepiece 130.

In operation, the lock 218 may continuously adjust the tension of the clamp defined by the first arm 210 and the second arm 212 on the telescope 110 via rotation of the threaded collar 222 in a counterclockwise direction. The user may be able to tighten the clamp as much as needed, as there is no set locking position for the threaded collar 222. There is an unlocked configuration, a locked configuration at which the lock 218 is first engaged (i.e., the threaded collar 222 first abuts the base 230), and a tightened configuration when the mechanism is fully engaged or "locked" (i.e., the user cannot turn the collar any further because it is so tight). The amount of engagement is not set, so that the user can keep tightening as much as needed until the connection to the telescope 110 is as tight as it can be (without damaging the telescope 110 or the adapter 116). Also, the user can stop rotating the threaded collar 222 at any time between the locked configuration and the tightened configuration to provide some adjustable tensioning of the optical device mounting feature 200.

As further shown in FIGS. 2A through 3B, the imaging device mounting feature 202 may securely receive the smartphone 114. The imaging device mounting feature 202 may have a base 240 with a generally planar surface on which the back of the smartphone 114 can rest. The imaging device mounting feature 202 may further have a first lateral grip 242, a second lateral grip 244, and a bottom flange 246. The bottom flange 246 may optionally be fixed in place relative to the base 240, and the first lateral grip 242 and/or the second lateral grip 244 may be slidable outward, away from the lateral edges of the base 240, to receive the smartphone 114.

More specifically, the first lateral grip 242 and the second lateral grip 244 may be slidable along a lateral rail 248, which may extend parallel to the direction of motion of the first lateral grip 242 and the second lateral grip 244. A rack and pinion mechanism or the like (not shown) may be used to control motion of the first lateral grip 242 and the second lateral grip 244 along the lateral rail 248. In some embodiments, such a mechanism may synchronize lateral motion of the first lateral grip 242 and the second lateral grip 244 such that, as one is moved toward or away from the base 240, the other is moved the same distance toward or away from the base 240. An internal biasing mechanism such as a spring (not shown) may bias the first lateral grip 242 and the second lateral grip 244 toward the base 240 (i.e., toward each other) to cause the first lateral grip 242 and the second lateral grip 244 to grip the smartphone 114 therebetween in the absence of external force drawing the first lateral grip 242 and the second lateral grip 244 apart.

The first lateral grip 242 may optionally have a loop 250 that is easily grasped by the user to facilitate manual motion of the first lateral grip 242 toward or away from the base 240. Thus, the user may grip the loop 250 and pull or push it to move the first lateral grip 242 and the second lateral grip 244, simultaneously, toward or away from the base 240.

In some examples, the user may mount the smartphone 114 to the imaging device mounting feature 202 by first pulling the loop 250 to draw the first lateral grip 242 and the second lateral grip 244 apart. He or she may then place the smartphone 114 such that the back of the smartphone 114 rests on the base 240. Then, he or she may release the loop 250 to allow the first lateral grip 242 and the second lateral grip 244 to move toward each other, and toward the smartphone 114, to grip the smartphone 114 on the base 240. As will be shown subsequently, the top part of the smartphone 114, including the camera lens, may protrude beyond the base 240 such that the base 240 does not interfere with passage of light from the eyepiece 130 to the camera lens of the smartphone 114.

In alternative embodiments, only one of the first lateral grip 242 and the second lateral grip 244 may be movable relative to the base 240. For example, only the first lateral grip 242 may be slidable along the lateral rail 248, and may be pulled outward via the loop 250 as described above while the second lateral grip 244 remains stationary relative to the base 240.

A "positioning mechanism" includes any mechanism that can provide for adjustable positioning of two components, and may thus include any of a wide variety of rotational and/or translating devices, including any mechanical components known in the art for positional adjustment. As mentioned previously, the positioning mechanism 204 may provide adjustable positioning of the imaging device mounting feature 202 relative to the optical device mounting feature 200 (and thence to the telescope 110) along three orthogonal axes.

Specifically, an X-axis 252 may be defined as the axis extending to the left and right, when viewing the screen of the smartphone 114 with the smartphone 114 secured to the imaging device mounting feature 202 (horizontally in FIG. 3A). A Y-axis 254 may be defined as the axis extending up and down, when viewing the screen of the smartphone 114 with the smartphone 114 secured to the imaging device mounting feature 202 (vertically in FIG. 3A). A Z-axis 256 may be defined as the axis extending perpendicular to the screen of the smartphone 114, with the smartphone 114 secured to the imaging device mounting feature 202 (into the page in FIG. 3A).

The positioning mechanism 204 may have an X-axis adjustment mechanism 262 that provides adjustment of the position of the imaging device mounting feature 202 relative to the optical device mounting feature 200, along the X-axis 252. The positioning mechanism 204 may also have a Y-axis adjustment mechanism 264 that provides adjustment of the position of the imaging device mounting feature 202 relative to the optical device mounting feature 200, along the Y-axis 254. Further, the positioning mechanism 204 may have a Z-axis adjustment mechanism 266 that provides adjustment of the position of the imaging device mounting feature 202 relative to the optical device mounting feature 200, along the Z-axis 256.

As embodied in the positioning mechanism 204, each of the X-axis adjustment mechanism 262, the Y-axis adjustment mechanism 264, and the Z-axis adjustment mechanism 266 may provide for linear translation of the imaging device mounting feature 202 relative to the optical device mounting feature 200. Various mechanically and/or electrically-driven linear actuators may accomplish such a purpose. In the exemplary embodiment of FIGS. 2A through 3B, each of the X-axis adjustment mechanism 262, the Y-axis adjustment mechanism 264, and the Z-axis adjustment mechanism 266 takes the form of a rack-and-pinion system.

More specifically, the X-axis adjustment mechanism 262 may have an X-axis pinion 272, an X-axis rack 274, and an X-axis control knob 276. The Y-axis adjustment mechanism 264 may have a Y-axis pinion 282, a Y-axis rack 284, and a Y-axis control knob 286. The Z-axis adjustment mechanism 266 may have a Z-axis pinion 292, a Z-axis rack 294, and a Z-axis control knob 296. For each of the X-axis adjustment mechanism 262, the Y-axis adjustment mechanism 264, and the Z-axis adjustment mechanism 266, the control knob may be rotated by hand to cause rotation of the associated pinion, thereby inducing the corresponding rack to translate in the corresponding direction (along the X-axis 252, the Y-axis 254, or the Z-axis 256).

The X-axis adjustment mechanism 262, the Y-axis adjustment mechanism 264, and the Z-axis adjustment mechanism 266 may thus function to not only enable fine control of the position of the imaging device mounting feature 202, relative to the optical device mounting feature 200, along the corresponding direction, but may also serve to securely retain the imaging device mounting feature 202 in place, relative to the optical device mounting feature 200, at the selected relative position. In some embodiments, a separate locking mechanism may be provided for this purpose. However, the rack-and-pinion systems incorporated into the X-axis adjustment mechanism 262, the Y-axis adjustment mechanism 264, and the Z-axis adjustment mechanism 266 may have sufficient mechanical advantage to retain the imaging device mounting feature 202 in the selected position, relative to the optical device mounting feature 200, until the user further actuates the associated control knob.

Advantageously, the X-axis adjustment mechanism 262, the Y-axis adjustment mechanism 264, and the Z-axis adjustment mechanism 266 may be actuated independently of each other, and in any order. Thus, the user may position the smartphone 114 in the manner that is most intuitive to the user. The user may find it advantageous to first use the X-axis adjustment mechanism 262 and the Y-axis adjustment mechanism 264 to align the camera lens of the smartphone 114 with the eyepiece 130. After alignment has been achieved, the user may view the display screen of the smartphone 114, as imagery is displayed on the display screen from the telescope 110, to determine whether and how to adjust the Z-axis adjustment mechanism 266 to achieve optimal focus and/or image size. The user may wish to use the Z-axis adjustment mechanism 266 to move the smartphone 114 toward and/or away from the eyepiece 130 until the image from the telescope 110 fills the screen of the smartphone 114, and is crisply focused.

Figure 4:
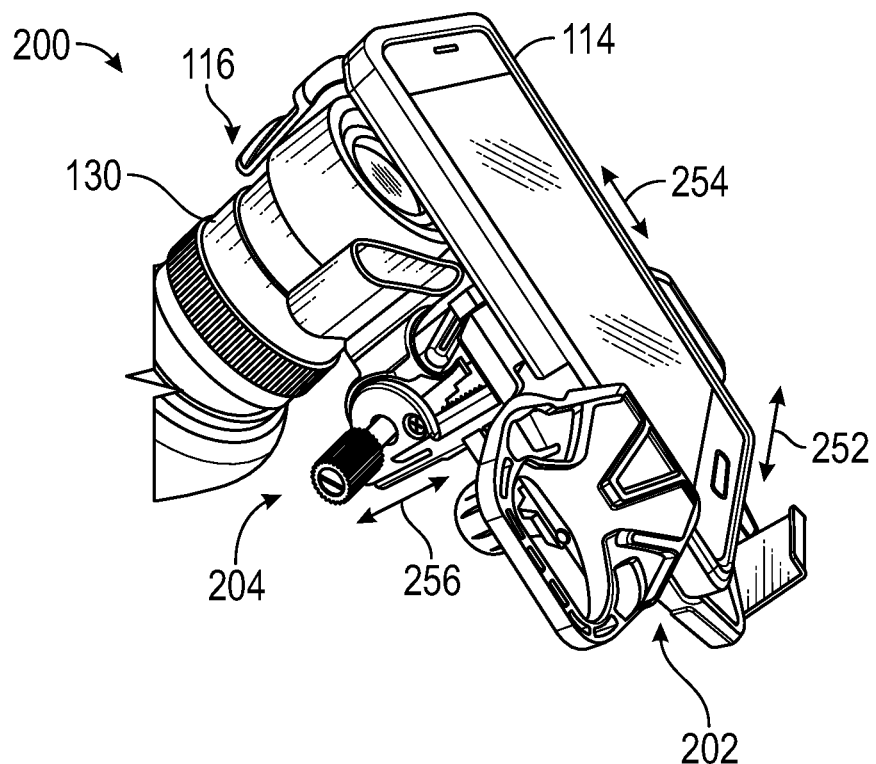
FIG. 4 is a perspective view of the adapter of FIG. 1 after mounting of the smartphone to the adapter, according to one embodiment.

FIG. 4 is a perspective view of the adapter 116 of FIG. 1 after mounting of the smartphone 114 to the adapter 116, according to one embodiment. The smartphone 114 has been secured to the imaging device mounting feature 202. As described previously, the positioning mechanism 204 may be used to adjust the position of the smartphone 114, relative to the eyepiece 130, along the X-axis 252, the Y-axis 254, and the Z-axis 256.

Figure 5:
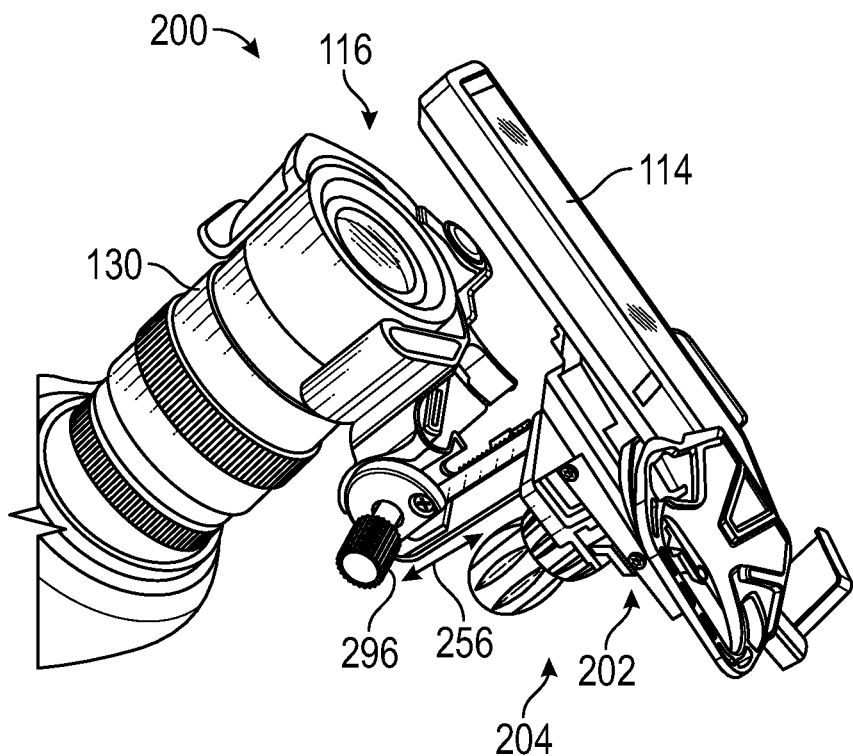
FIG. 5 is a perspective view of the adapter of FIG. 1 during Z-axis adjustment, according to one embodiment.

FIG. 5 is a perspective view of the adapter 116 of FIG. 1 during Z-axis adjustment, according to one embodiment. As shown, the user may grasp and rotate the Z-axis control knob 296 to move the adapter 116, relative to the eyepiece 130, along the Z-axis 256, until the smartphone 114 is positioned at the optimal distance from the eyepiece 130.

Figure 6:
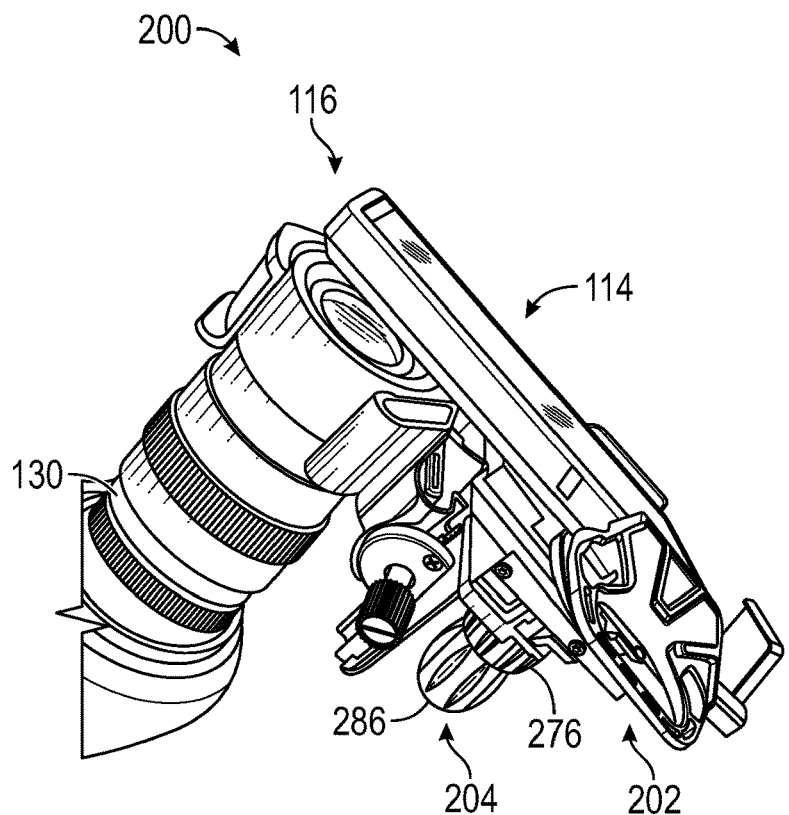
FIG. 6 is a perspective view of the adapter of FIG. 1 showing the position of the smartphone with respect to the eyepiece after Z-axis fine adjustment is made, according to one embodiment.

FIG. 6 is a perspective view of the adapter 116 of FIG. 1 showing the position of the smartphone 114 with respect to the eyepiece 130 after Z-axis fine adjustment is made, according to one embodiment. The camera lens of the smartphone 114 is now positioned closer to the eyepiece 130. If desired, the X-axis control knob 276 and the Y-axis control knob 286 may be grasped and rotated to carry out X-axis adjustment and/or Y-axis adjustment of the position of the smartphone 114, relative to the eyepiece 130. Additionally or alternatively, such adjustment may be done prior to Z-axis adjustment, as described previously.

Figure 7:
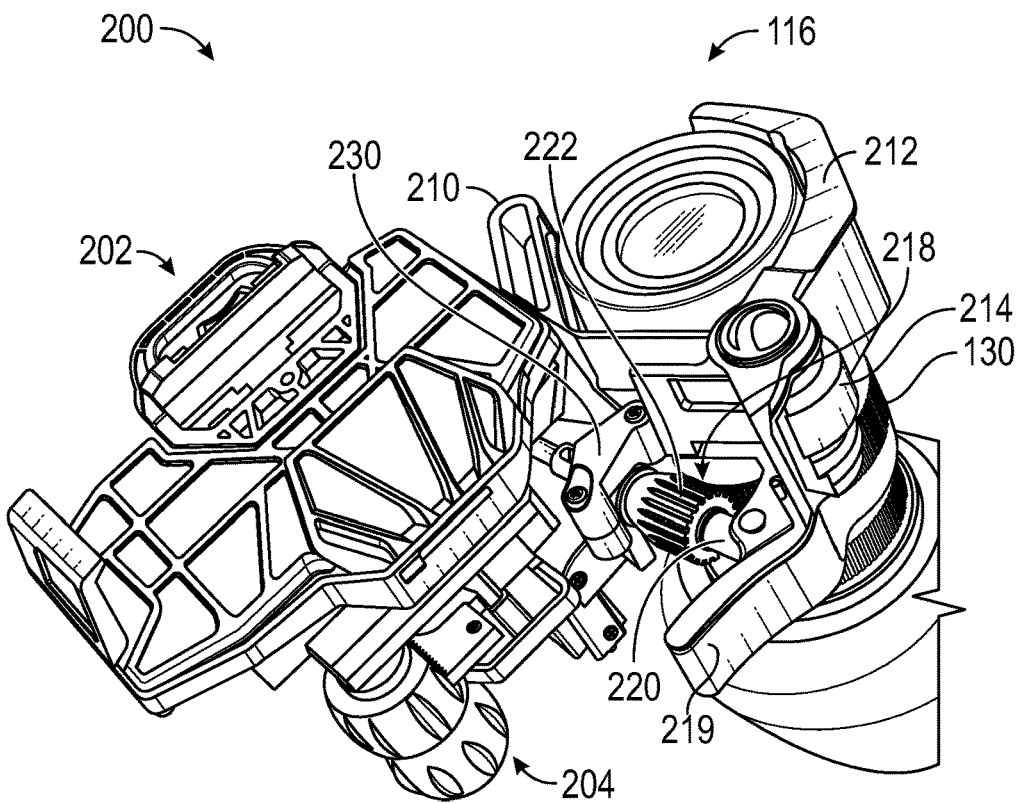
FIG. 7 is a perspective view of the adapter of FIG. 1, showing the operation of the lock, according to one embodiment.

FIG. 7 is a perspective view of the adapter 116 of FIG. 1, showing the operation of the lock 218, according to one embodiment. Rotating the threaded collar 222 counterclockwise may extend the threaded rod 220 away from the base 230 (more clearly shown in FIGS. 2B and 3A) of the first arm 210 such that the threaded rod 220 pushes the handle 219 to tighten and lock the engagement of the optical device mounting feature 200 on the eyepiece 130.

Figure 8:
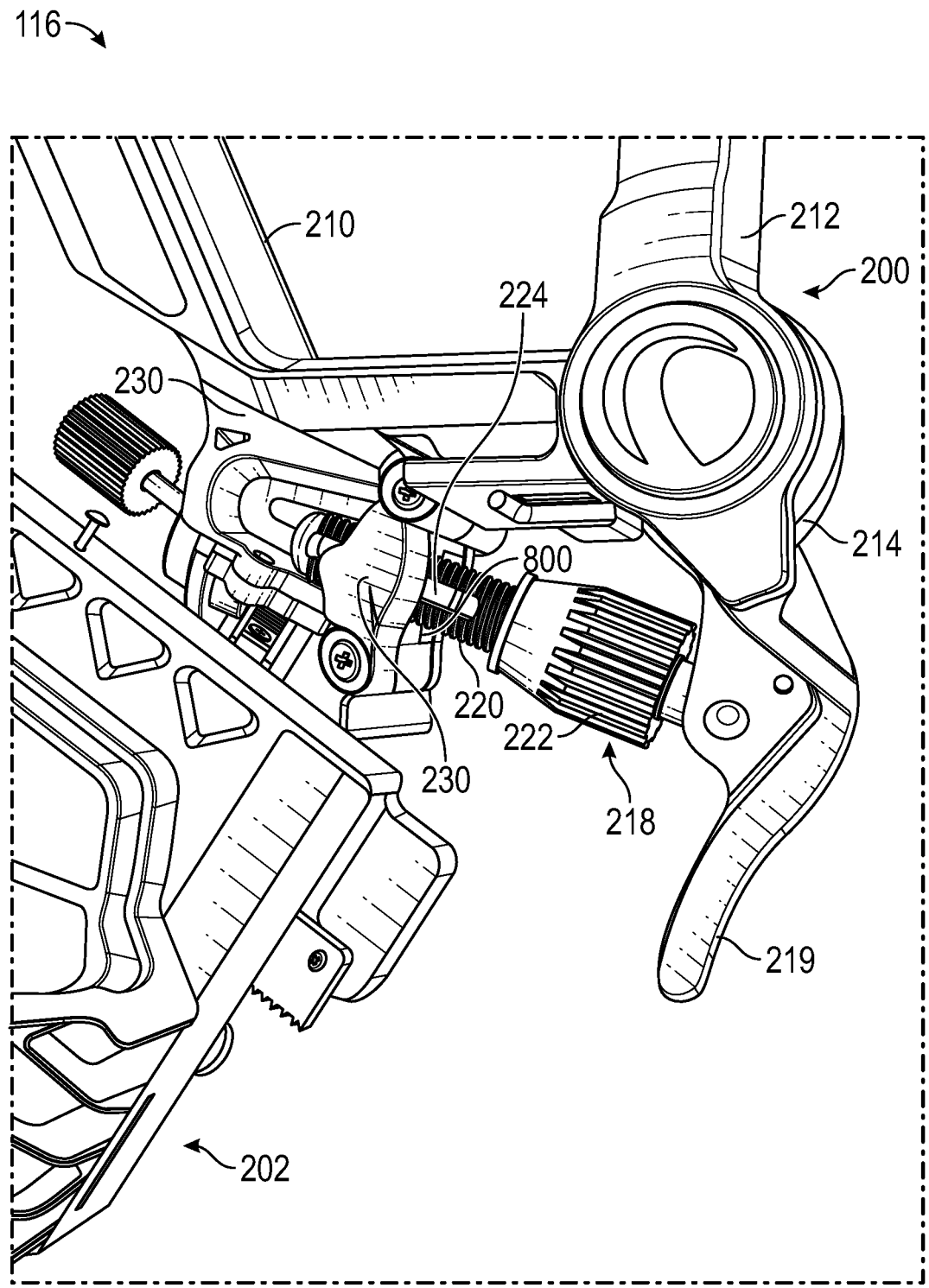
FIG. 8 is a perspective view of the adapter of FIG. 1, further showing the operation of the lock, according to one embodiment.

FIG. 8 is a perspective view of the adapter 116 of FIG. 1, further showing the operation of the lock 218, according to one embodiment. When the threaded collar 222 is not tightened (i.e., is in the unlocked position), the threaded rod 220 may freely move into and out of the base 230 through a hole 800 in the base 230 as the handle 219 is actuated. The first pin 226 (more clearly shown in FIG. 3A) may ride in the slot 224 of the threaded rod 220 to smoothly guide motion of the threaded rod 220.

Exemplary Coupling Method

FIGS. 9 through 14 depict steps for operating the adapter 116, according to one embodiment.

Figure 9:
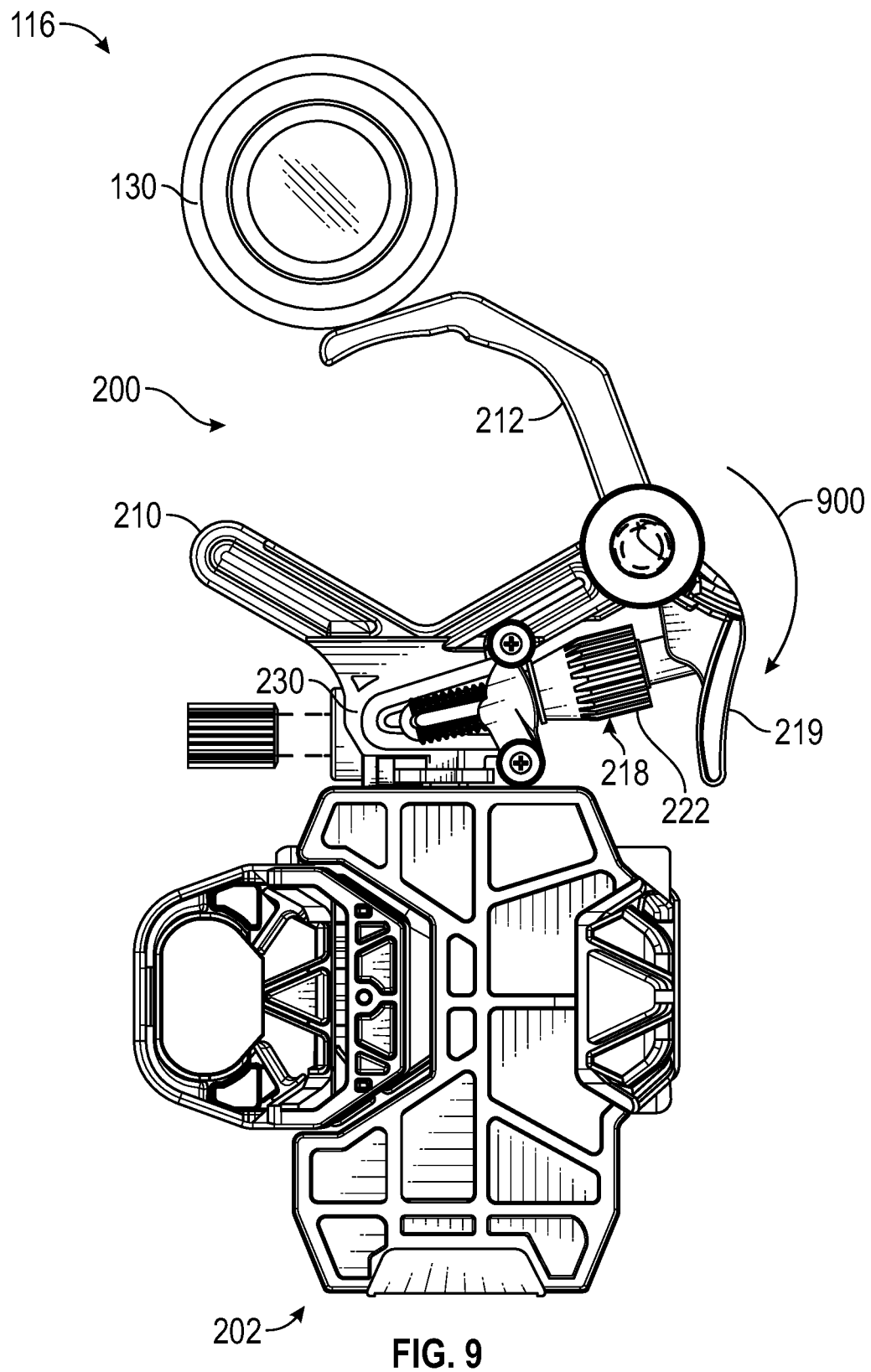
FIGS. 9 through 14 depict steps for operating the adapter, according to one embodiment.
Figure 10:
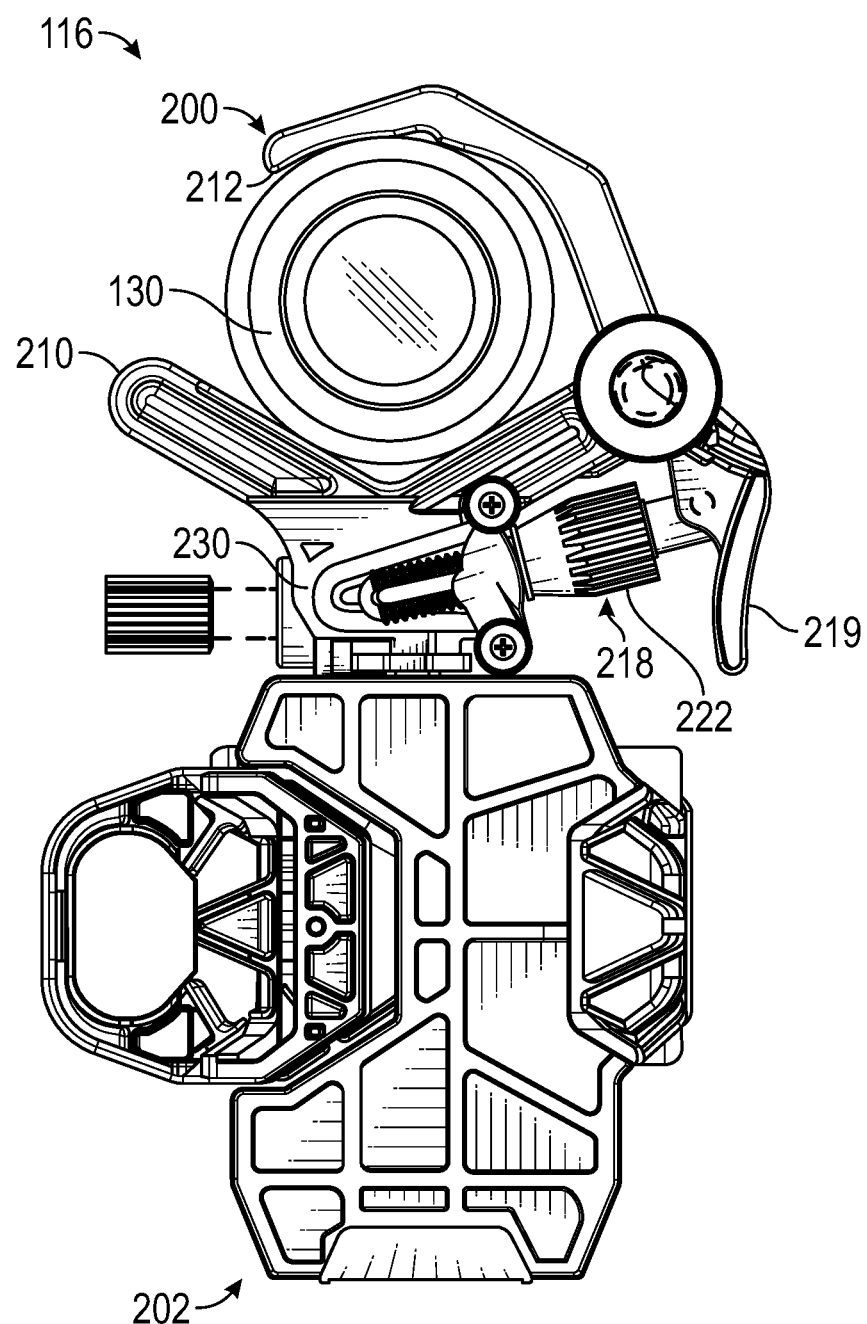

First, the user secures the adapter 116 to the telescope 110, or more specifically to the eyepiece 130. This is illustrated in FIGS. 9 and 10. For telescopes, binoculars, and spotting scopes, the user may grip the handle 219 and urge it toward the base 230 to open the clamp defined by the first arm 210 and the second arm 212, as shown by the arrow 900 in FIG. 9. The user may then position the clamp around the eyepiece 130, release the handle 219, and tighten the threaded collar 222. For microscopes, prior to performing these steps, the user may attach an adapter ring (not shown) that fits the microscope's eyepiece to increase its effective diameter so that the optical device mounting feature 200 can effectively grip it. The user then uses the lock 218 to lock the optical device mounting feature 200 in place on the eyepiece 130 as described above.

Figure 11:
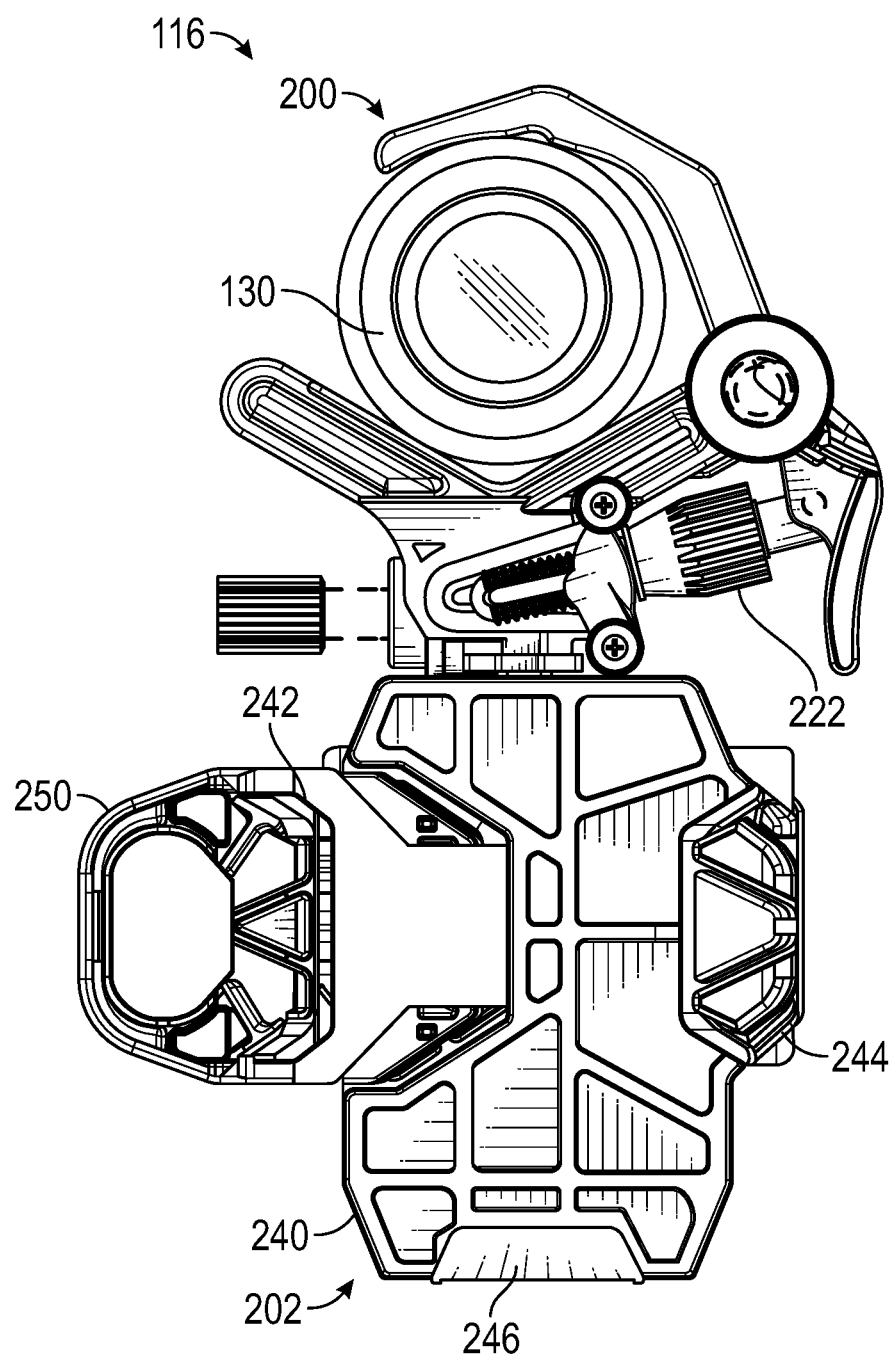
Figure 12:
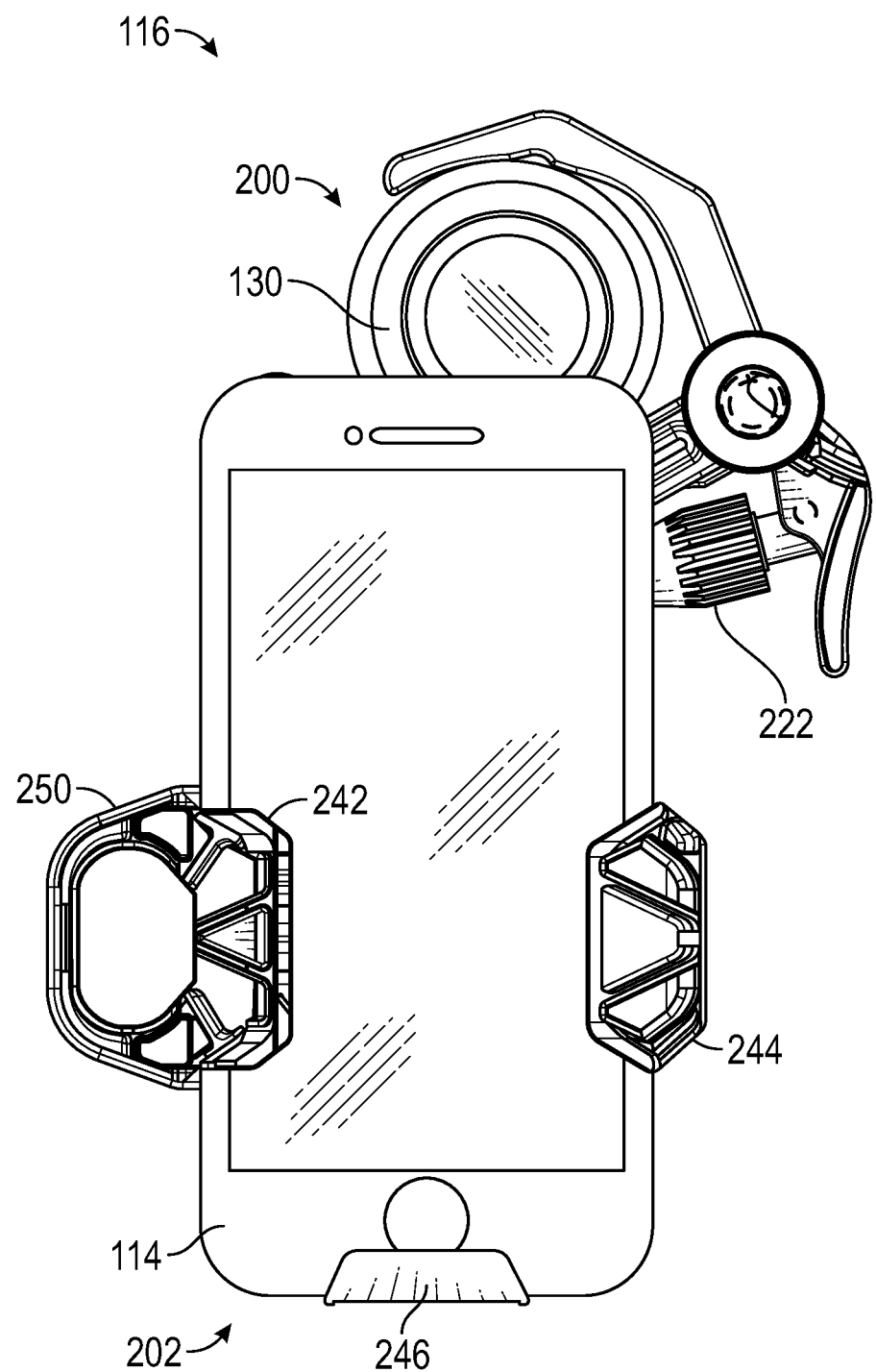

Next, the user attaches the smartphone 114 to the imaging device mounting feature 202. This is illustrated in FIGS. 11 and 12. The user may extend the first lateral grip 242 by grasping and pulling the loop 250 as described above. The user may then place the smartphone 114 on the base 240, making sure the bottom of the smartphone 114 rests on the bottom flange 246 and the back of the smartphone 114 rests on the base 240, and may then release the loop 250 to allow the first lateral grip 242 to move toward the base 240 such that the first lateral grip 242 and the second lateral grip 244 grip the sides of the smartphone 114. The smartphone 114 is now secure and ready for imaging.

Figure 13:
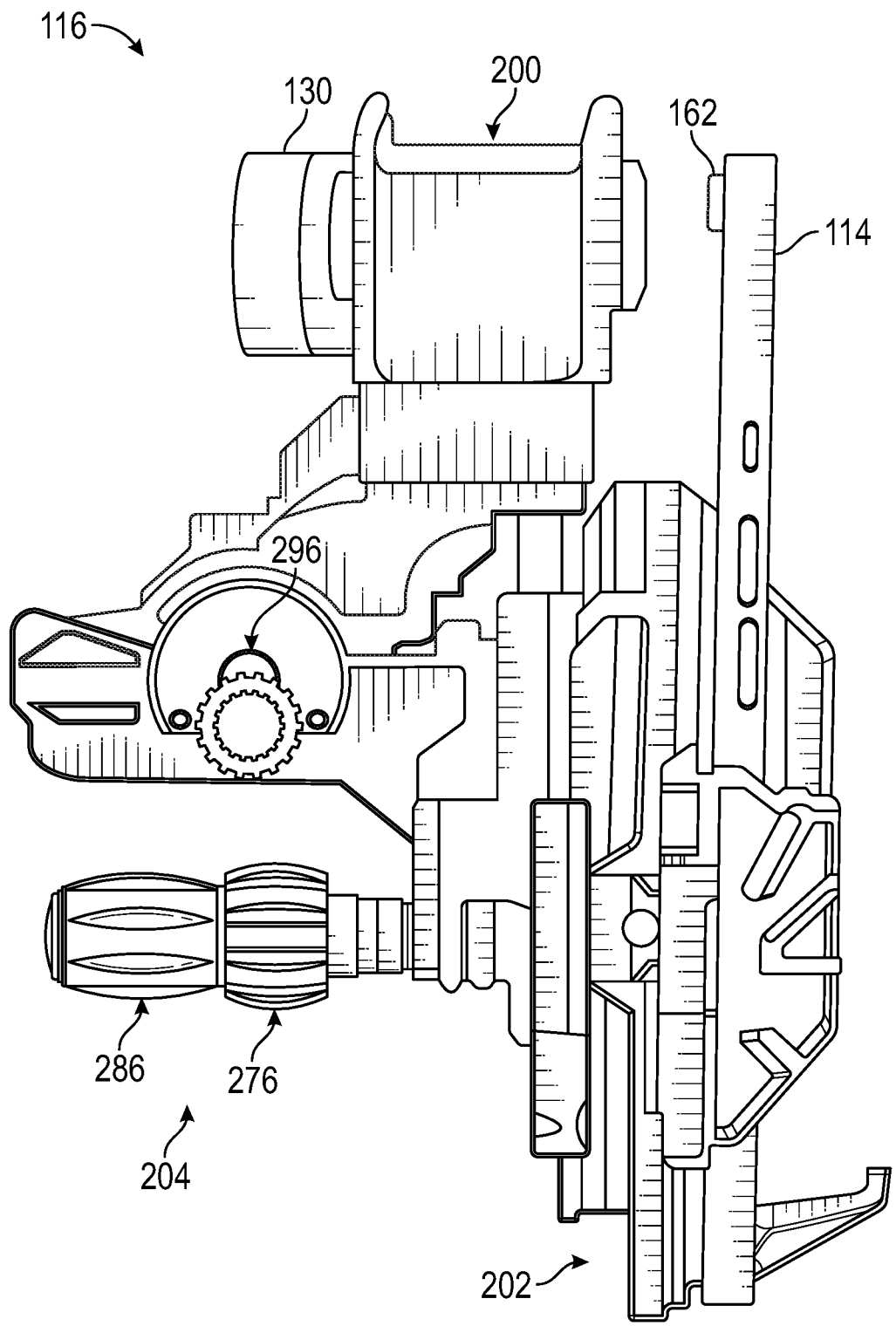
Figure 14:
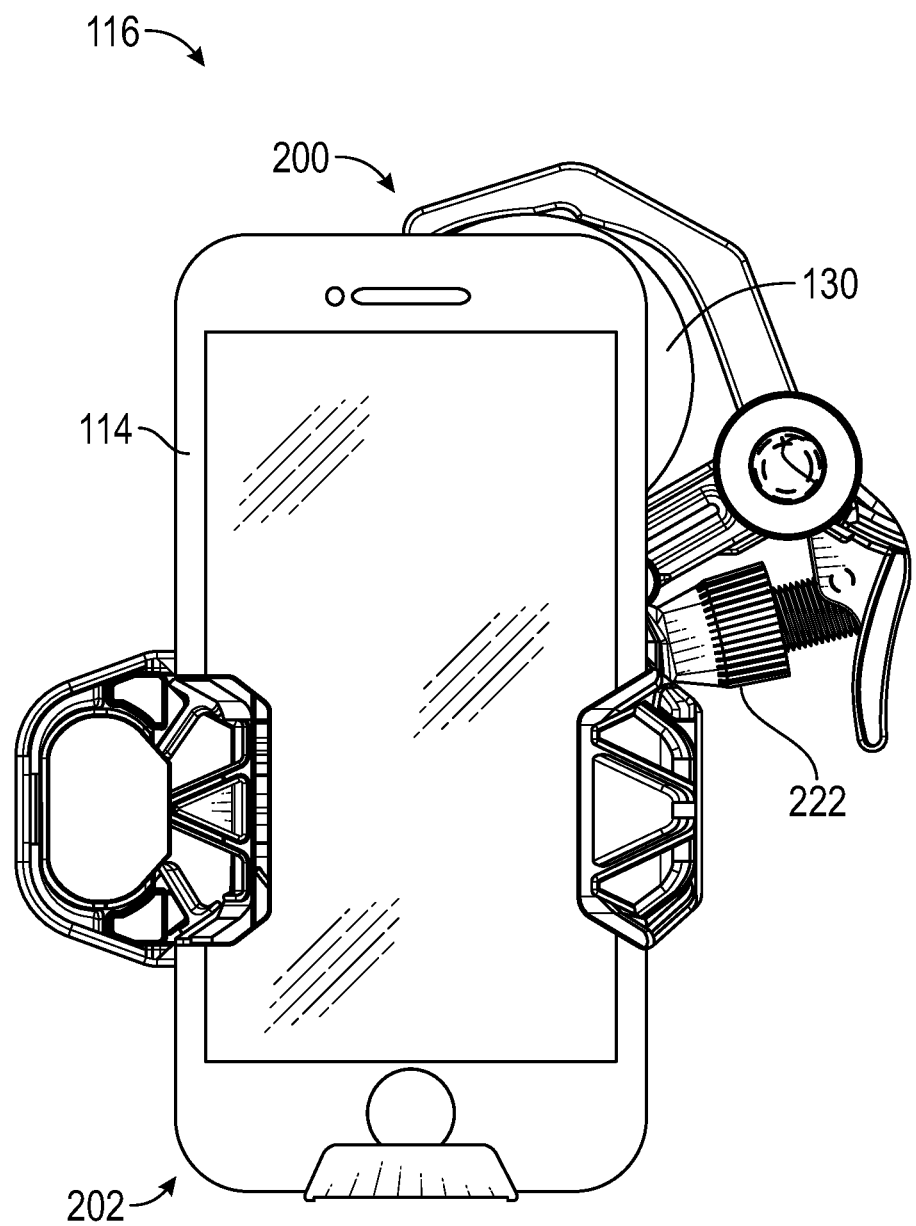

Next, the user proceeds with adjustment of the position of the smartphone 114 relative to the eyepiece 130, as described previously. This is illustrated in FIGS. 13 and 14. The user may open a camera app on the smartphone 114, position the smartphone 114 over the eyepiece 130 using the X-axis control knob 276 and the Y-axis control knob 286, and use the Z-axis control knob 296 to move the smartphone 114 closer to or further away from the eyepiece 130 until the image received from the telescope 110 substantially fills the capture area of the camera 162 of the smartphone 114. The user may then adjust the focus and proceed to capture images.

The above description and referenced drawings set forth particular details with respect to possible embodiments. Those of skill in the art will appreciate that the techniques described herein may be practiced in other embodiments. First, the particular naming of the components or capitalization of terms is not mandatory or significant, and the mechanisms that implement the techniques described herein may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. An adapter for coupling an imaging device to an optical device, the adapter comprising:
   an optical device mounting feature configured to mount the adapter to the optical device, the optical device mounting feature comprising:
      a first arm;
      a second arm that is movable relative to the first arm to clamp a portion of the optical device between the first arm and the second arm;
      a handle, affixed to the second arm, that can be actuated to release the clamped portion of the optical device;
      a lock that can be actuated to restrict motion of the second arm away from the first arm,
         wherein the lock comprises a threaded knob that is rotatable to advance the knob toward and into contact with the handle to restrict motion of the second arm away from the first arm,
         and wherein the threaded knob is further rotatable, in contact with the handle, to urge the handle in a direction that causes the second arm to be urged toward the first arm, thereby clamping the portion of the optical device between the first arm and the second arm with user-adjustable clamping force;
   an imaging device mounting feature configured to mount an imaging device to the adapter; and
   a positioning mechanism that adjustably positions the imaging device mounting feature relative to the optical device mounting feature.

2. The adapter of claim 1, wherein the optical device mounting feature further comprises a resilient mechanism that urges the second arm toward the first arm.

3. The adapter of claim 1, wherein the positioning mechanism can be actuated to move the imaging device along a Z-axis toward or away from the optical device.

4. The adapter of claim 3, wherein the positioning mechanism comprises:
   an X-axis rack;
   an X-axis pinion coupled to the X-axis rack such that rotation of the X-axis pinion causes translation of the X-axis rack along the X-axis;
   an X-axis actuation interface coupled to the X-axis pinion such that manual rotation of the X-axis actuation interface causes rotation of the X-axis pinion;
   a Y-axis rack;
   a Y-axis pinion coupled to the Y-axis rack such that rotation of the Y-axis pinion causes translation of the Y-axis rack along the Y-axis;
   a Y-axis actuation interface coupled to the Y-axis pinion such that manual rotation of the Y-axis actuation interface causes rotation of the Y-axis pinion;
   a Z-axis rack;

a Z-axis pinion coupled to the Z-axis rack such that rotation of the Z-axis pinion causes translation of the Z-axis rack along the Z-axis; and a Z-axis actuation interface coupled to the Z-axis pinion such that manual rotation of the Z-axis actuation interface causes rotation of the Z-axis pinion.

5. The adapter of claim 3, wherein the positioning mechanism comprises:

a Z-axis rack;

a Z-axis pinion coupled to the Z-axis rack such that rotation of the Z-axis pinion causes translation of the Z-axis rack along the Z-axis; and a Z-axis actuation interface coupled to the Z-axis pinion such that manual rotation of the Z-axis actuation interface causes rotation of the Z-axis pinion.

6. The adapter of claim 3, wherein the positioning mechanism can further be actuated to move the imaging device along an X-axis perpendicular to the Z-axis.

7. The adapter of claim 6, wherein the positioning mechanism can further be actuated to move the imaging device along a Y-axis perpendicular to the X-axis and the Z-axis.

8. The adapter of claim 1, wherein the positioning mechanism can be actuated to move the imaging device along a Z-axis toward or away from the optical device, along an X-axis perpendicular to the Z-axis, and along a Y-axis perpendicular to the X-axis and the Z-axis.

9. A method for coupling an imaging device to an optical device with an adapter, the method comprising:

with an optical device mounting feature of the adapter, mounting the adapter to the optical device by clamping a portion of the optical device between a first arm and a second arm that is movable relative to the first arm so that the clamped portion of the optical device can be released by actuation of a handle affixed to the second arm;

actuating a lock to restrict motion of the second arm away from the first arm by rotating a threaded knob to advance the knob toward and into contact with the handle to restrict motion of the second arm away from the first arm, and further rotating the threaded knob, while it is in contact with the handle, to urge the handle in a direction that causes the second arm to be urged toward the first arm, thereby clamping the portion of the optical device between the first arm and the second arm with user-adjustable clamping force;

with an imaging device mounting feature of the adapter, mounting an imaging device to the adapter; and with a positioning mechanism of the adapter, adjustably positioning the imaging device mounting feature relative to the optical device mounting feature.

10. The method of claim 9, wherein adjustably positioning the imaging device mounting feature relative to the optical device mounting feature comprises actuating the positioning mechanism to move the imaging device along a Z-axis toward or away from the optical device.

11. The method of claim 10, wherein:

the positioning mechanism comprises a Z-axis rack, a Z-axis pinion, and a Z-axis actuation interface; and actuating the positioning mechanism to move the imaging device along the Z-axis comprises manually rotating the Z-axis actuation interface to cause rotation of the Z-axis pinion to cause translation of the Z-axis rack along the Z-axis.

12. The method of claim 10, wherein adjustably positioning the imaging device mounting feature relative to the optical device mounting feature further comprises actuating the positioning mechanism to move the imaging device along an X-axis perpendicular to the Z-axis.

13. The method of claim 12, wherein adjustably positioning the imaging device mounting feature relative to the optical device mounting feature further comprises actuating the positioning mechanism to move the imaging device along a Y-axis perpendicular to the X-axis and the Z-axis.

14. The method of claim 13, wherein:

the positioning mechanism comprises an X-axis rack, an X-axis pinion, an X-axis actuation interface, a Y-axis rack, a Y-axis pinion, and a Y-axis actuation interface;

actuating the positioning mechanism to move the imaging device along the X-axis comprises manually rotating the X-axis actuation interface to cause rotation of the X-axis pinion to cause translation of the X-axis rack along the X-axis; and actuating the positioning mechanism to move the imaging device along the Y-axis comprises manually rotating the Y-axis actuation interface to cause rotation of the Y-axis pinion to cause translation of the Y-axis rack along the Y-axis.

15. The method of claim 9, wherein:

the optical device mounting feature further comprises a resilient mechanism; and mounting the adapter to the optical device further comprises, with the resilient mechanism, urging the second arm toward the first arm.

\* \* \* \* \*